United States Patent Office 2,798,409
Patented July 9, 1957

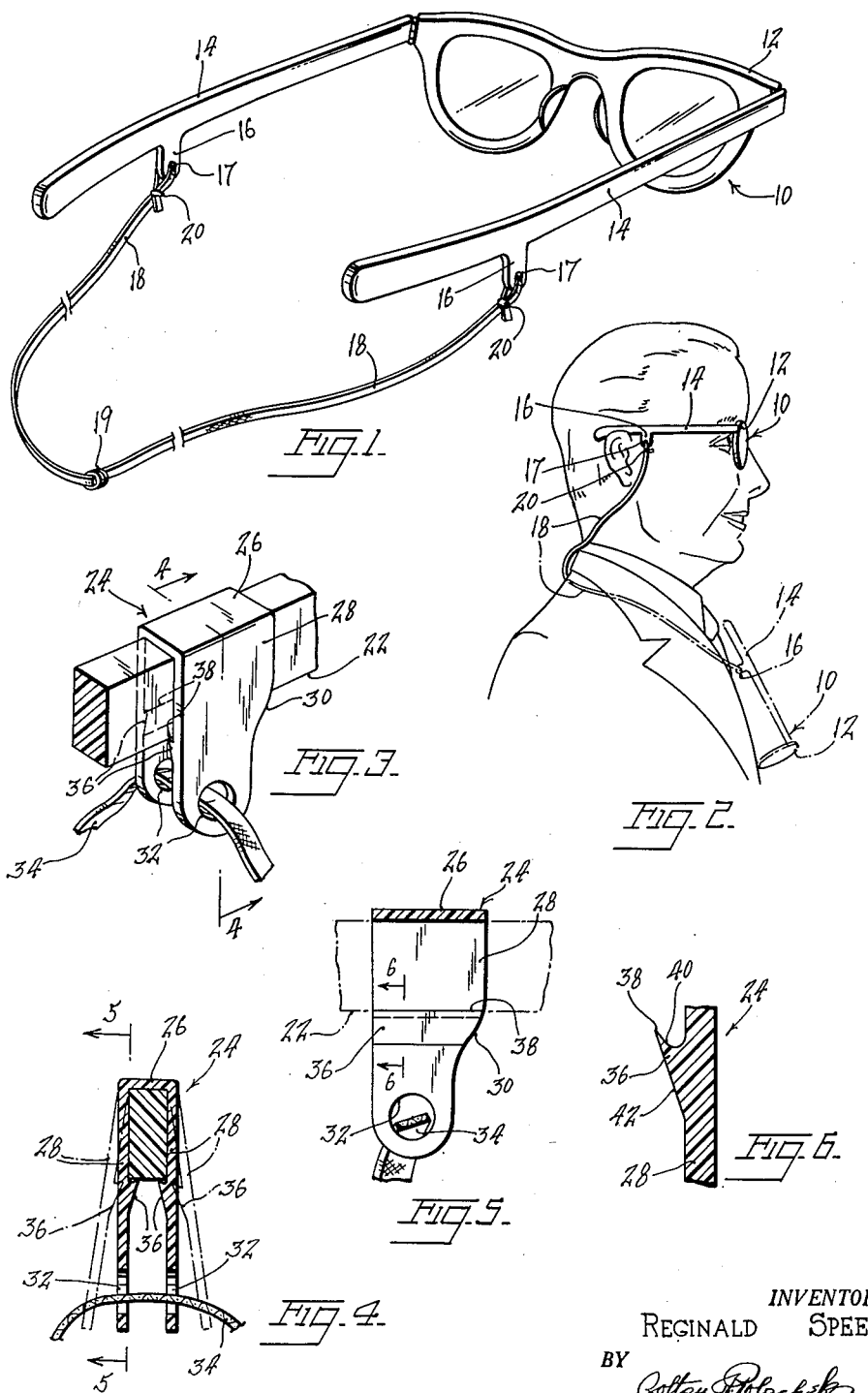

2,798,409

SAFETY SUPPORT FOR SPECTACLES

Reginald Speers, Forest Hills, N. Y.

Application May 18, 1954, Serial No. 430,540

1 Claim. (Cl. 88—51)

This invention relates to means on the temples of spectacles which will permit the spectacles to be dropped from their use position while still being held ready for their next use.

It has heretofore been proposed to provide a ribbon connectable at its ends to eyeglass temples, for the purpose mentioned above. However, previously the ribbon attachment has been connected to the temples at locations in back of the wearer's ears. This represents an inconvenience to the user, since one tends, when taking his or her spectacles off, to move the same forwardly. When the retaining ribbon is attached to the temples in back of the ears, positive steps must, under the circumstances indicated, be taken to prevent entangling of the ribbon with the ears, so that the ribbon and eyeglasses will drop downwardly free of engagement with the ears.

One important object of the present invention is to provide spectacles which will include an attachment so located on the temples as to be positioned forwardly of the ears, thereby to permit the spectacles to drop downwardly from use position to be retained about the neck of the wearer, without entangling or engagement of the ribbon attachment with the ears.

A further important object is to provide a retainer as stated in which, in one form of the invention, clip means for the ribbon can be readily assembled with any of various conventional temples, in selected positions of adjustment longitudinally of the temples.

For further comprehension of the invention and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of spectacles equipped with a retaining attachment formed in accordance with the present invention.

Fig. 2 is a side elevational view showing the spectacles when worn, the dotted lines showing the position thereof when dependingly supported about the neck of the user.

Fig. 3 is an enlarged, fragmentary perspective view of an eyeglass temple to which has been applied a modified form of the retainer constituting the invention.

Fig. 4 is a transverse sectional view on line 4—4 of Fig. 3, the dotted lines showing the position of the retaining clip when being moved or applied to the temple.

Fig. 5 is a sectional view on line 5—5 of Fig. 4, the temple being illustrated in dotted outline.

Fig. 6 is a greatly enlarged, detail sectional view on line 6—6 of Fig. 5, showing one of the temple-engaging teeth of the clip.

The reference numeral 10 has been applied generally in Figs. 1 and 2 to spectacles including the usual lens frame 12. Hinged to the lens frame are temples 14. In accordance with conventional practice, the free ends of the temples are not curved to extend downwardly, but are left as horizontal extensions of the body portions of the temples.

Integrally formed upon the temples 14, inwardly from the free ends of the temples a distance approximately one-third of the overall length of the temples, are depending, relatively elongated extensions 16. These are disposed immediately in front of the ears of the wearer when the spectacles are worn, as shown in full lines in Fig. 2, and are formed adjacent their free ends with openings 17 receiving the ends of a ribbon 18, said ends of the ribbon being knotted as at 20 or otherwise secured to the extensions 16 after being passed through the openings.

By reason of this arrangement, whenever desired the glasses may be permitted to drop downwardly from the full to the dotted line Fig. 2 positions. In the dotted position the spectacles will be dependingly supported about the neck of the wearer by the ribbon 18.

Since the extensions 16 are located forwardly of the ears, and are straight from end to end, a straight line movement of the spectacles in a horizontal direction to the right in Fig. 2 will completely disengage the temples from the wearer's ears, without danger of the ribbon 18 or extensions 16 becoming entangled or otherwise engaged with the ears. When the spectacles are being returned to their use position, they can be placed in the full line position of Fig. 2 without interference from the support attachment.

The ribbon 18 is shown with a snap fastener joining means 19 so that the ribbon or the like may be placed around the wearer's neck and joined at the back of the neck or the member 19 may be separated and anchored to a button hole or to other portions of the garment. The joining means may also be a button, clip, pin or the like.

In Figs. 3–6 there is shown a modified form, wherein the extensions, instead of being formed integrally with the temples, are fashioned separately therefrom, and are detachably and adjustably engaged with the temples. This permits the invention to be associated with spectacles already in use, without necessity of modifying the temple construction in any way. Further, the construction shown in Figs. 3–6 allows the extensions to be located at any selected point along the length of the temples found most convenient to the user.

In this form, the extensions would be disposed in front of the ears of the wearer, as in Fig. 2, but longitudinal adjustment of the extensions along the temples can be effected to properly locate the extensions relative to the ears of a particular user. In any event, the respective extensions can be each formed from a single piece of molded plastic material or the like, having springable characteristics as shown in the full and dotted line positions of Fig. 4. Or, metal can be used, as well as any other material having the requisite characteristics of springability.

The extensions for both temples are aligned, so the description of one will suffice the other. Each extension is of inverted U-shape, and has been designated generally as 24. The extension is relatively wide, having a bight 26 engaging against the top surface of the temple 22 of the spectacles. Along its opposite side edges, bight 26 is integral with depending leg portions 28, said leg portions and bight cooperating to straddle the temple 22. The leg portions extend downwardly below the temple a substantial distance as shown in Fig. 4, those portions of the legs disposed below the temple having a leading edge recessed as at 30 to reduce the overall width of said leg portions.

In the depending free ends of legs 28 there are formed transversely aligned openings 32 receiving the associated end of a ribbon 34 similar to ribbon 18. Said end can be knotted or otherwise attached to the extension, in the manner previously described herein.

On the inner surfaces of the legs 28, immediately between the opposite ends thereof, confronting, inwardly facing teeth 36 are integrally formed. These extend the full width of the extension as shown in Fig. 5, each tooth being formed with an upwardly facing apex portion 38 extending the full width of the leg and spaced inwardly from the inner surface of said leg. The apex portion 38 is provided by the convergence of upwardly inclined side surfaces 40, 42 of the tooth, the surface 40 being inclined upwardly in a direction away from the inner surface of the associated leg, and the surface 42 constituting an outer side surface of the tooth and being also inclined upwardly in a direction from the associated leg, though at a steeper angle than the surface 40, thus to acutely relate said surfaces 40, and 42, and bring the same into convergence at the apex of the tooth.

The teeth are so located as to engage firmly against the underside of temple 22, when the extension is in the full line position shown in Fig. 4. Thus, the extension can be applied to the temple by spreading the legs outwardly from one another to the dotted line position shown in Fig. 4, to permit the extension to be slipped over the temple and adjusted longitudinally of the temple to a selected location. When the proper location has been found, the legs 28 are released, permitting said legs to spring inwardly to parallel relationship shown in full lines in Fig. 4, in which relationship they are disposed with their teeth 36 in engagement with the underside of temple 22, to hold the extension and temple against relative looseness. Each tooth, of course, extends along a substantial part of the length of the temple, as shown in Fig. 5, and further, the clip or extension itself is relatively wide so as also to extend along a substantial part of the length of the temple. As a result, when the teeth bite into the underside of the temple, any tendency toward looseness or rocking movement of the clip upon the temple will be effectively precluded.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A safety support for spectacles having substantially straight temples with flat tops, bottoms, and sides, comprising a pair of inverted U-shaped clips, each of the clips having a flat bight and flat depending legs, each clip having two teeth formed integrally with the legs, there being one of said teeth one each leg of the clip, said two teeth being formed respectively on the inner surfaces of the two legs and confronting each other, each of the teeth having an apex spaced inwardly from the associated surface of the leg, said apex being extended toward the flat bight, said apex being elongated and parallel to said associated surface and having a length substantially equal to the width of said leg, said clip being formed of springable material for resilient spreading of the legs, said clip being adapted to fit the bight thereof over the flat top of one of the temples with the depending legs straddling the sides, and with the teeth engaging and biting into the flat bottom of the temple under spring tension, each of said legs having an aperture located near the free end thereof, and a ribbon secured at opposite ends in the apertures of the legs of each clip and joining the clips together

References Cited in the file of this patent

UNITED STATES PATENTS

| | | |
|---|---|---|
| 924,633 | Caldwell | June 15, 1909 |
| 2,023,523 | Grimball | Dec. 10, 1935 |
| 2,249,572 | Lieber | July 15, 1941 |
| 2,317,873 | Alger | Apr. 27, 1943 |
| 2,499,140 | Griffith | Feb. 28, 1950 |
| 2,550,348 | Hansen | Apr. 24, 1951 |
| 2,649,255 | Pendleton | Aug. 11, 1953 |
| 2,649,020 | Wheeler | Aug. 18, 1953 |

OTHER REFERENCES

"Spec-Grip," an advertisement in The Optical Journal and review of Optometry, vol. LXXXVIII, Issue 20, page 73, published October 15, 1951.